(12) United States Patent
Oman (10) Patent No.: US 6,314,109 B1
(45) Date of Patent: Nov. 6, 2001

(54) METHOD AND APPARATUS FOR ADDING OR AUGMENTING A NETWORK NODE

(75) Inventor: Jeffry Ralph Oman, Kanata (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/015,937

(22) Filed: Jan. 30, 1998

(51) Int. Cl.[7] .............................. G08C 15/00; H04J 3/12; H04J 3/22; H04L 12/28
(52) U.S. Cl. .................. 370/467; 370/221; 370/229; 370/230; 370/231; 370/410; 370/466; 370/465; 370/522; 370/524
(58) Field of Search .................... 370/410, 466, 370/467, 522, 524, 465, 351, 352, 389, 441, 442; 379/221, 229, 230, 231

(56) References Cited

U.S. PATENT DOCUMENTS

| | | | |
|---|---|---|---|
| 5,029,165 | * 7/1991 | Choi et al. | 370/110.1 |
| 5,048,081 | * 9/1991 | Gavaras et al. | 379/221 |
| 5,862,129 | * 1/1999 | Bell et al. | 370/236 |
| 5,926,482 | * 7/1999 | Christie et al. | 370/469 |
| 5,974,133 | * 10/1999 | Fleisher, III et al. | 379/230 |
| 6,079,036 | * 6/2000 | Moharram | 714/712 |

* cited by examiner

*Primary Examiner*—Dang Ton
*Assistant Examiner*—Toan Nguyen
(74) *Attorney, Agent, or Firm*—Foley & Lardner

(57) ABSTRACT

A replacement or augmentative node device is added as an adjunct to an existing node device in a manner that is transparent to the remaining nodes of the network and that avoids disruption of network services. The existing node device ("host") and the replacement or augmentative ("adjunct") device each maintain the point code of the host for communication with other nodes of the network. For communication between the host and the adjunct, the adjunct maintains a unique adjunct point code. A manner of replacing a node device that does not cause disruption of network services is achieved by providing the replacement device as an adjunct to an original node device. Linksets joining network nodes to the original device are then migrated to the replacement device in any order that avoids disruption of network services.

10 Claims, 8 Drawing Sheets

METHOD AND APPARATUS FOR ADDING OR AUGMENTING A NETWORK NODE

FIELD OF THE INVENTION

The invention pertains to communication networks such as public switched telephone networks (PSTNs). The invention addresses the problem of minimizing the amount of network reconfiguration necessitated by the addition or augmentation of a device constituting a network node.

BACKGROUND OF THE INVENTION

Figure 1:
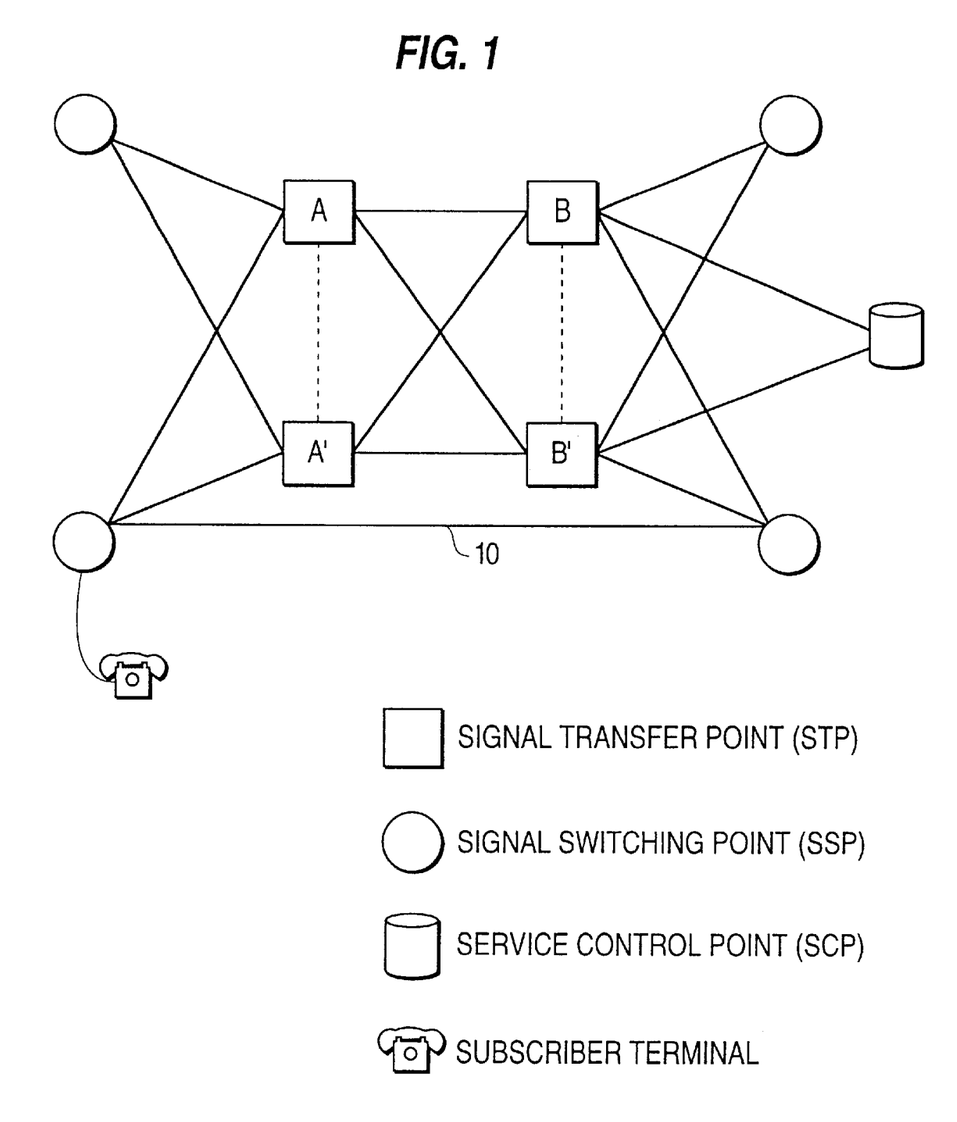
FIG. 1 illustrates a conventional PSTN.

Communication networks generally comprise nodes and linksets that connect the nodes to form the network. The basic elements of a conventional PSTN in a typical PSTN configuration are illustrated in FIG. 1. As seen in FIG. 1, the network includes signal transfer points (STPs), service switching points (SSPs), and service control points (SCPs). An STP is a network hub that provides routing of messages between other network nodes. An SSP may be a network end point to which subscriber terminals are connected, or may be a tandem point that handles trunk traffic for other SSPs. An SCP is a network endpoint that provides database services to subscribers such as calling number identification, voice mail, and toll-free calling.

The STPs, SSPs and SCPs and their associated link sets are collectively referred to as the signaling side of the communication network. The primary functions of the signaling side of the network are to establish connections between SSPs and to provide data management for network services. Once a connection is established between SSPs, voice or other data originated from subscriber terminals is carried by trunks such as the trunk 10 shown in FIG. 1.

It is typical in PSTNs to provide redundancy of STPs so that failure of an STP does not disable part of the network. STPs are typically deployed in mated pairs, such that each network node connected to an STP of a mated pair is also connected to the other STP of the mated pair. In the conventional PSTN illustrated in FIG. 1, it may be seen that each network node connected to STP A is also connected to STP A', and each network node connected to STP B is also connected to STP B'.

Communications among network nodes in the signalling side of the network may be routed using point codes. A point code corresponds to a physical device that constitutes a network node. Communications between two network nodes include an originating point code (OPC) that identifies the node originating the message, and a destination point code (DPC) that identifies the node to receive the message. The ability of a node to receive a message from another node therefore requires knowledge of the node's point code at other nodes of the network. In the alternative, some messages may be routed using global title queries. A global title query specifies a logical address as the destination of the query, and a global title translation is performed on the query at an STP to determine a physical address for use as the DPC of the message.

Under some circumstances it is necessary or desirable to change or augment the device that constitutes a network node. For example, an existing device may be replaced by a new device in order to provide enhanced capabilities at that node. Similarly, a new device may be added to supplement an existing device, for example, to enable a wider range of services or to expand the number of link sets to the node. The new device may provide supplemental functions, and/or may also duplicate functions of the original device.

In accordance with conventional practice, a node is replaced by disconnecting all links to the existing device and reestablishing those links to the new device, which then assumes the point code of that node. However, this can have the undesirable effect of disabling part of the network during the replacement process. Alternatively, in accordance with conventional practice, a device may be replaced or supplemented by the addition of a new device having a new point code. However, this practice can have the undesirable effect of requiring reconfiguration of the other network nodes to recognize the new point code of the new node. Other conventional methods for adding or augmenting node devices are cumbersome and may entail disadvantages similar to those noted above.

SUMMARY OF THE INVENTION

It is therefore an object of the present invention to augment or replace node devices in a manner that is transparent to the remaining nodes of the network and that avoids disruption of network services.

This object is accomplished, in general terms, by introducing a replacement or augmentative node device as an adjunct to an existing node device. For purposes of the invention, the existing device will be referred to as a "host" device, and the replacement or augmentative device will be referred to as an "adjunct" device. For communication with other nodes of the network, the host and adjunct each maintain the point code of the host. As a result, the host-adjunct unit appears to the rest of the network to be a single node. For communication between the host and the adjunct, the adjunct maintains a unique adjunct point code.

It is a further object of the invention to provide a manner of replacing a node device that does not cause disruption of network services. In general terms, this object is achieved by providing the replacement device as an adjunct to the original device as described above. Linksets joining network nodes to the original device are then migrated to the replacement device in any order that avoids disruption of network services.

Various embodiments of the invention for accomplishing these objects are discussed in the detailed disclosure provided below.

DESCRIPTION OF THE DRAWINGS

The invention will be understood through reference to the following description of preferred embodiments, in accordance with the accompanying drawings, in which.

DETAILED DESCRIPTION OF THE INVENTION AND PREFERRED EMBODIMENTS

Figure 2:
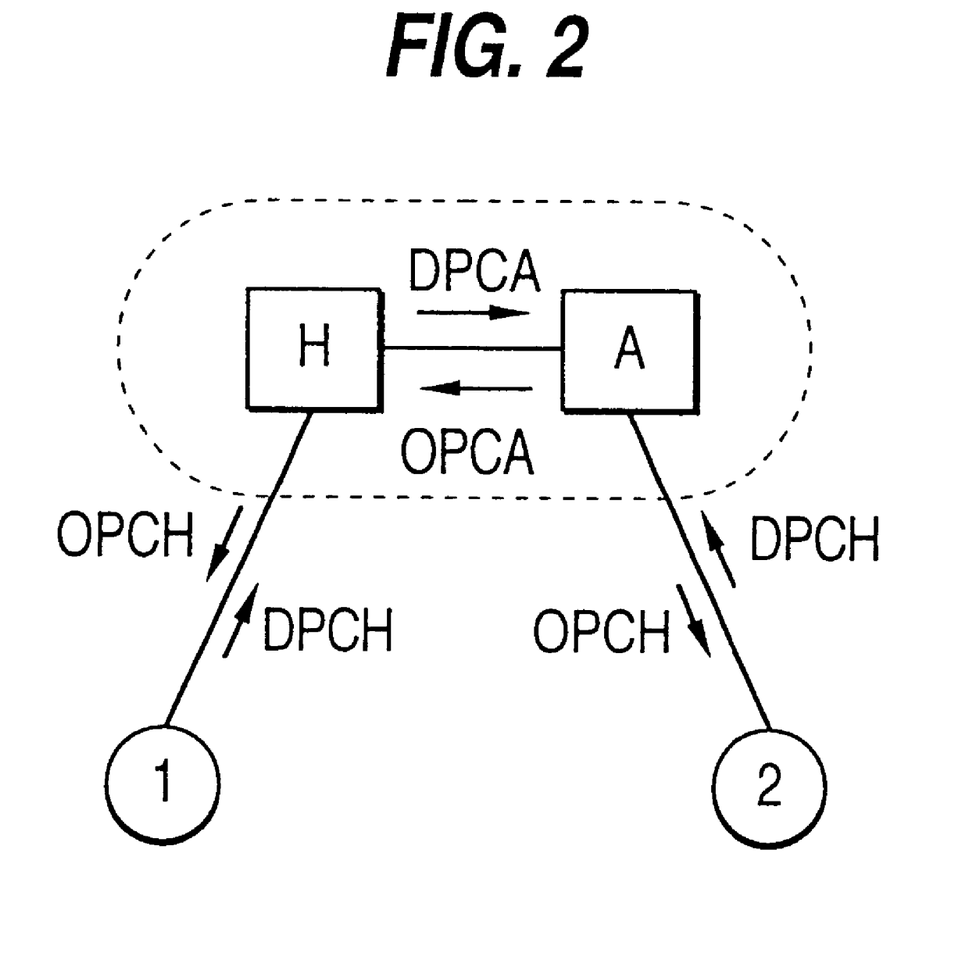
FIG. 2 illustrates communication between a host device, an adjunct device, and network nodes in accordance with the invention.

As noted above, the invention may be embodied in node devices and related processes for communication between an original (host) node device and a replacement or augmentative (adjunct) device. FIG. 2 provides a generic illustration of communication between a host device and an adjunct device in accordance with the invention. As seen in FIG. 2, a host device H is augmented by an adjunct device A. The adjunct device may be an eventual replacement for the host device, or it may provide services that supplement those provided by the host.

A first linkset joins the host H to the adjunct A. Messages provided from the host H to the adjunct A include an originating point code (OPC) that specifies the originating device and a destination point code (DPC) that specifies the adjunct as the destination device. Similarly, messages provided from the adjunct A to the host H include an OPC that specifies the adjunct A as the originating device and a DPC that specifies the destination device.

A second linkset joins the host H to a node 1. Messages from node 1 to the host include a DPC that specifies the host as the destination device. Messages from the host to node 1 include an OPC that specifies the host as the originating node. The host and other nodes of the network therefore communicate in the conventional manner.

A third linkset joins the adjunct A to a node 2. As in the case of communications between the host and node 1, messages from node 2 to the adjunct include a DPC that specifies the host as the destination device, and messages from the adjunct to node 2 include an OPC that specifies the host as the originating node. The adjunct therefore assumes the identity of the host for communication with nodes of the network other than the host.

The functionalities of various embodiments of the invention as illustrated in FIG. 2 are now described. In describing these embodiments, it is assumed that each host and adjunct device includes a communication interface, a data storage subsystem, a data processing subsystem, and appropriate control programming for achieving the described functionalities.

Figure 3A:
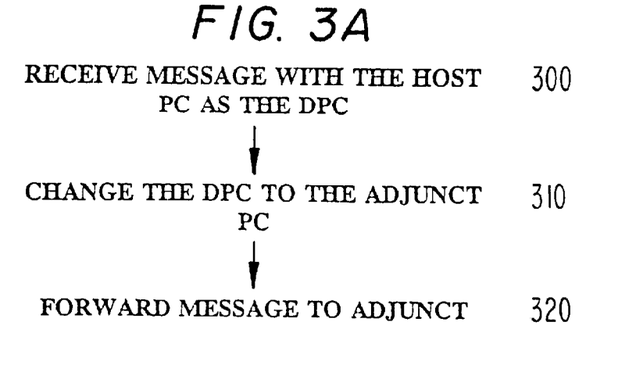
FIGS. 3a–3d illustrate processes for message management in accordance with a first embodiment of the invention.
Figure 3B:
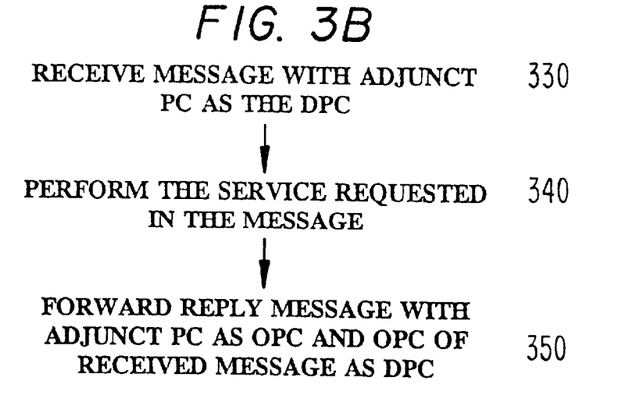
Figure 3C:
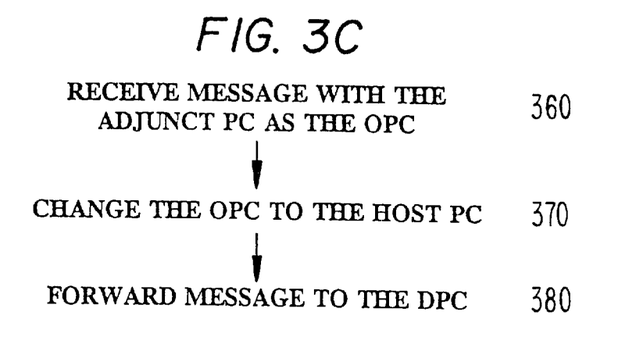
Figure 3D:
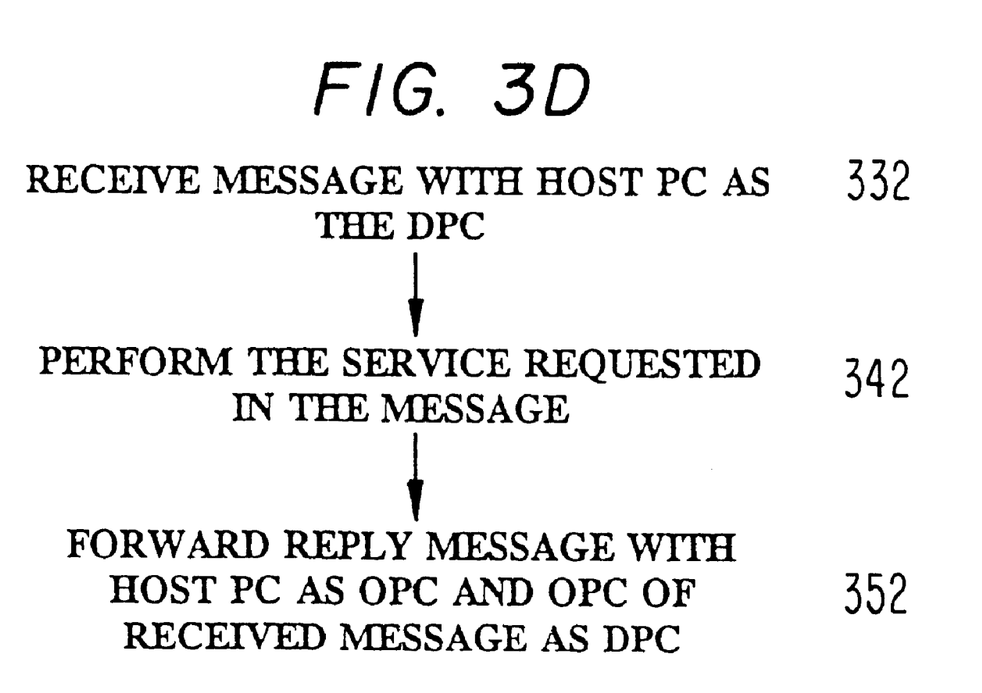

In a first embodiment of the invention, an adjunct is provided for assuming all functions of a host device at a terminating node such as an SSP or an SCP. Accordingly, all messages directed to the host are forwarded to the adjunct for performance of the service requested in the message. A process in accordance with this embodiment for managing communication in a host is illustrated in FIGS. 3a and 3c. A corresponding process for managing communication in an adjunct is illustrated in FIG. 3b, and a further process for managing communication in an adjunct is illustrated in FIG. 3d.

As seen in FIG. 3a, when a message is received 300 at the host with the host PC as the DPC, the host changes 310 the DPC of the message to the adjunct PC. The host then forwards 320 the message to the adjunct. Thus, as illustrated in FIG. 3b, the adjunct receives 330 a message having the adjunct PC as the DPC. The adjunct then performs 340 the service requested in the message, and forwards 350 a reply having the adjunct PC as the OPC and the OPC of the received message as the DPC. Consequently, as illustrated in FIG. 3c, a message is received 360 at the host with the adjunct PC as the OPC. The host changes 370 the OPC to the host PC and forwards 380 the message to the node specified by the DPC of the message.

It is noted that an adjunct of the first embodiment may receive messages from nodes of the system other than its corresponding host node. Such messages would be directed to the adjunct over a link set connected directly to the adjunct and addressed using the host PC as the DPC. A further process for managing communication under these circumstances in accordance with the first embodiment of the invention is illustrated in FIG. 3d. As seen in FIG. 3d, when the adjunct receives 332 a message having the host PC as the DPC, the adjunct performs 342 the service requested in the message, and forwards 352 a reply having the host PC as the OPC and the OPC of the received message as the DPC.

In the first embodiment, the communication interface, data processing subsystem, data storage subsystem and control programming of the host work together to perform the disclosed functions of the host. The host therefore comprises a means for changing a DPC of a received message from the host PC to the adjunct PC, and means for changing an OPC of a message received from the adjunct to the host PC. Similarly, the communication interface, data processing subsystem, data storage subsystem and control programming of the adjunct work together to perform the disclosed functions of the adjunct. The adjunct therefore comprises a means for performing a service requested in a message having the adjunct PC as the DPC and providing a reply having the adjunct PC as the OPC and the OPC of the received message as the DPC, and a means for performing a service requested in a message having the host PC as the DPC and for returning a reply having the host PC as the OPC and the OPC of the received message as the DPC.

Figure 4A:
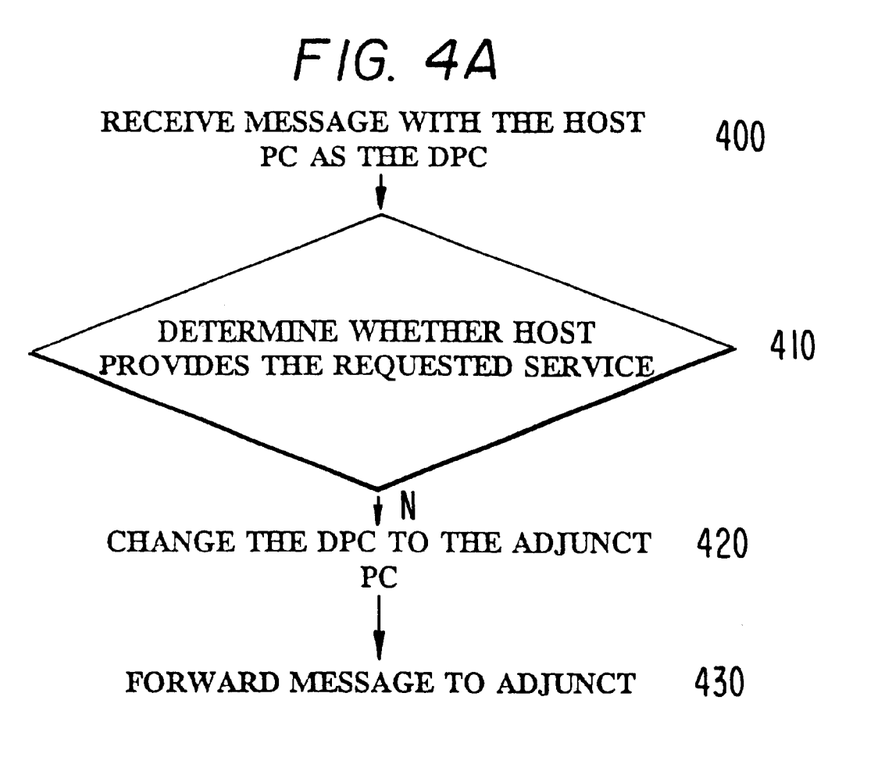
FIGS. 4a–4d illustrate processes for message management in accordance with a second embodiment of the invention.
Figure 4B:
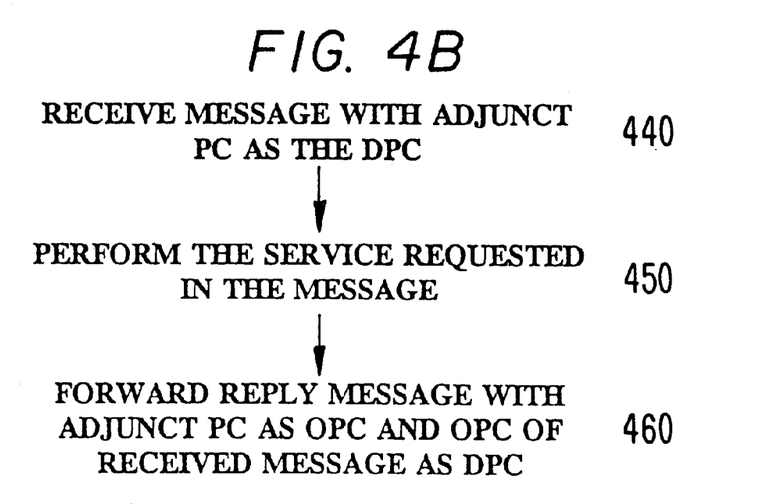
Figure 4C:
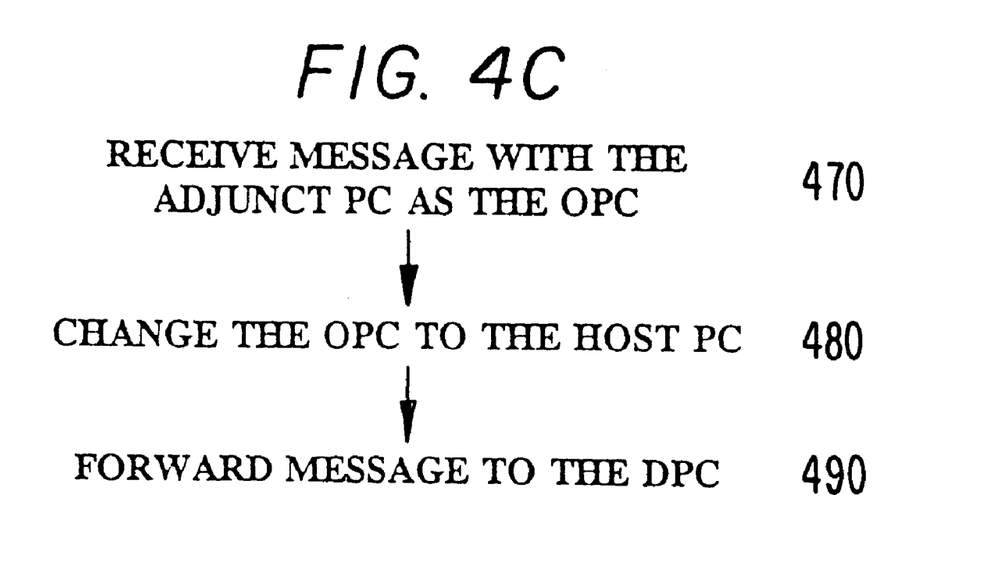
Figure 4D:
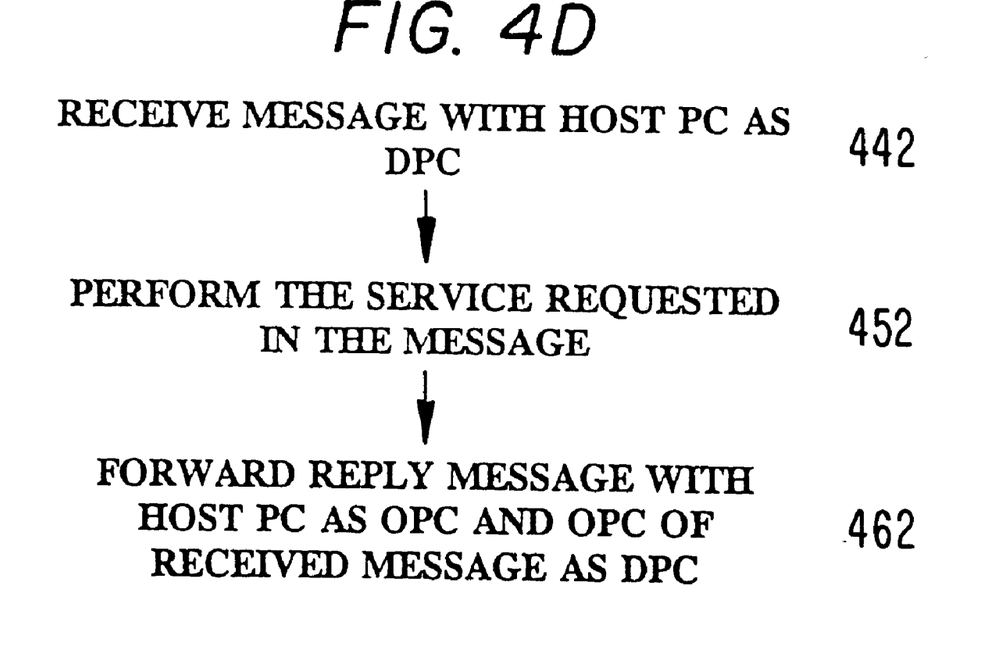

In a second embodiment of the invention, an adjunct is provided for supplementing the functions of a host device at a terminating node such as an SSP or an SCP. Accordingly, messages directed to the host are forwarded to the adjunct for performance of the service requested in the message when the requested service is one performed by the adjunct rather than the host. A process in accordance with this embodiment for managing communication in a host is illustrated in FIGS. 4a and 4c. A corresponding process for managing communication in an adjunct is illustrated in FIG. 4b, and a further process for managing communication in an adjunct is illustrated in FIG. 4d.

As seen in FIG. 4a, when a message is received 400 at the host with the host PC as the DPC, the host determines 410 whether the message requests a service that is performed by the host. If the message requests a service that is not performed by the host, the host changes 420 the DPC of the message to the adjunct PC. The host then forwards 430 the message to the adjunct. Thus, as illustrated in FIG. 4b, the adjunct receives 440 a message having the adjunct PC as the DPC. The adjunct then performs 450 the service requested in the message, and forwards 460 a reply having the adjunct PC as the OPC and the OPC of the received message as the DPC. Consequently, as illustrated in FIG. 4c, a message is received 470 at the host with the adjunct PC as the OPC. The host changes 480 the OPC to the host PC and forwards 490 the message to the node specified by the DPC of the message.

It is noted that an adjunct of the second embodiment may receive messages from nodes of the system other than its corresponding host node. It is assumed in the second embodiment that the adjunct is capable of providing all services that the host is capable of providing. Such messages would be directed to the adjunct over a linkset connected directly to the adjunct and would be addressed using the host PC as the DPC. A further process for managing communication under these circumstances in accordance with the first embodiment of the invention is illustrated in FIG. 4d. As seen in FIG. 4d, when the adjunct receives 442 a message having the host PC as the DPC, the adjunct performs 452 the service requested in the message, and forwards 462 a reply having the host PC as the OPC and the OPC of the received message as the DPC.

In the second embodiment, the communication interface, data processing subsystem, data storage subsystem and control programming work together to perform the disclosed functions of the host. The host therefore comprises a means for determining whether the host performs a function requested in a message, means for changing a DPC of a message requesting a function not performed by the host from the host PC to the adjunct PC, and means for changing an OPC of a message received from the adjunct to the host PC. Similarly, the communication interface, data processing subsystem, data storage subsystem and control programming of the adjunct work together to perform the disclosed functions of the adjunct. The adjunct therefor comprises a means for performing a service requested in a message having the adjunct PC as the DPC and providing a reply having the adjunct PC as the OPC and the OPC of the received message as the DPC, and a means for performing a service requested in a message having the host PC as the DPC and for returning a reply having the host PC as the OPC and the OPC of the received message as the DPC.

In a third embodiment of the invention, an adjunct provides the functions that are provided by a host device at a terminating node such as an SSP or an SCP, and provides additional supplemental functions beyond those of the host device. Accordingly, messages directed to the host are forwarded to the adjunct for performance of the service requested in the message when the requested service is one that is not performed by the host. Thus the host functions in the manner illustrated in FIGS. 4a and 4c. Similarly, messages received by the adjunct using the adjunct point code are managed by the adjunct and responded to as illustrated in FIG. 4d, and messages received by the adjunct using the host point code are managed by the adjunct and responded to as illustrated FIG. 4d. Consequently, in accordance with the third embodiment, the host and adjunct may respectively comprise means as discussed with reference to the second embodiment.

In a fourth embodiment of the invention, an adjunct is provided for assuming the functions of a host device at a hub node such as an STP. In such cases, the messages are processed in host and in the adjunct in the manners described with respect to the first embodiment. It will be appreciated that hub nodes may receive messages with destination point codes other than their own. The "service" requested in these messages may comprise the simple routing of the message to its destination and, typically, the receipt of an acknowledgement or reply message from the destination node. Alternatively, the requested service may comprise another service that may be provided in a hub, for example, protocol translation. It will be further appreciated that the hub node receives global title (logical address) queries. Global title queries received by the host are likewise forwarded to the adjunct. Thus the "service" requested in the message is for global title translation and forwarding of the message to the appropriate node, and receipt of an acknowledgement or response from the destination node.

Thus in the fourth embodiment, the communication interface, data processing subsystem, data storage subsystem and control programming of the host work together to perform the disclosed functions of the host. The host therefore comprises a means for changing a DPC of a received message from the host PC to the adjunct PC, and means for changing an OPC of a message received from the adjunct to the host PC. Similarly, the communication interface, data processing subsystem, data storage subsystem and control programming of the adjunct work together to perform the disclosed functions of the adjunct. The adjunct therefore comprises a means for performing a service requested in a message having the adjunct PC as the DPC and providing a reply having the adjunct PC as the OPC and the OPC of the received message as the DPC, and a means for performing a service requested in a message having the host PC as the DPC and for returning a reply having the host PC as the OPC and the OPC of the received message as the DPC.

In a fifth embodiment of the invention, an adjunct is provided for supplementing the functions of a host device at a hub node such as an STP. In such cases, the messages are processed in host and in the adjunct in the manners described with respect to the second embodiment. It will be appreciated that the "service" requested in messages with destination point codes may be understood to be the simple routing of the message to its destination and, typically, the receipt of an acknowledgement or reply message from the destination node. Alternatively, the service requested in such a message may be a request for performing a function such as one typically provided by an SSP, or one typically provided by an STP such as global translation. It will be further appreciated that global title queries received by the host may likewise be forwarded to the adjunct. Alternatively, the global title query may be performed in the host, and it may be determined that the message should be forwarded to the point code of the adjunct for performance of a supplemental service enabled at the adjunct. Thus the "service" requested in the message is for global title translation and forwarding of the message to the appropriate node, and receipt of an acknowledgement or response from the destination node.

Thus in the fifth embodiment, the communication interface, data processing subsystem, data storage subsystem and control programming of the host work together to perform the disclosed functions of the host. The host therefore comprises a means for determining whether the host performs a function requested in a message, means for changing a DPC of a message requesting a function not performed by the host from the host PC to the adjunct PC, and means for changing an OPC of a message received from the adjunct to the host PC. Similarly, the communication interface, data processing subsystem, data storage subsystem and control programming of the adjunct work together to perform the disclosed functions of the adjunct. The adjunct therefore comprises a means for performing a service requested in a message having the adjunct PC as the DPC and providing a reply having the adjunct PC as the OPC and the OPC of the received message as the DPC, and a means for performing a service requested in a message having the host PC as the DPC and for returning a reply having the host PC as the OPC and the OPC of the received message as the DPC.

In a sixth embodiment of the invention an adjunct is provided at a hub node such as an STP for providing the functions provided by a host device, and for providing additional supplemental functions beyond those provided by the host device. Accordingly, messages having the host point code received by the host are forwarded to the adjunct for performance of the service requested in the message when the requested service is one that is not performed by the host. Thus the host functions in the manner illustrated in FIGS. 4a and 4c. Similarly, messages received by the adjunct using the adjunct point code are managed by the adjunct and responded to as illustrated FIG. 4b, and messages received by the adjunct using the host point code are managed by the adjunct and responded to as illustrated FIG. 4d.

Consequently, in accordance with the sixth embodiment, the host and adjunct may respectively comprise means as discussed with reference to the second embodiment.

Further embodiments of the invention involve methods for replacing a host device with another device that is introduced as an adjunct to the host device. This method may be employed where it is desired to substitute a new device at a node without disrupting the network. In the seventh embodiment, the node is a terminal node with no attached subscriber terminals. In the eighth embodiment, the node is a terminal node with subscriber terminals attached. In the ninth embodiment, the node is hub node such as an STP.

Figure 5:
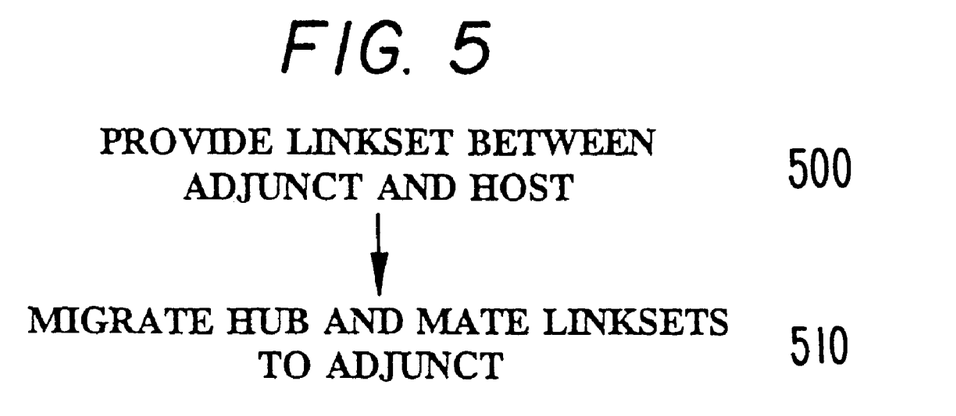
FIG. 5 illustrates a process for migration of linksets to an adjunct device in accordance with a seventh embodiment of the invention.

A method in accordance with the seventh embodiment is illustrated in FIG. 5. As shown in FIG. 5, the method involves providing 500 a linkset between the adjunct and the host. The adjunct would be of the type disclosed in regard to the first embodiment or third embodiment, since the adjunct will ultimately assume all functions of the host and may provide additional functions. Linksets from hubs and mates are then migrated 510 to the adjunct. At this point the adjunct has effectively assumed the role of the host, and the host may be disconnected from the network.

Figure 6:
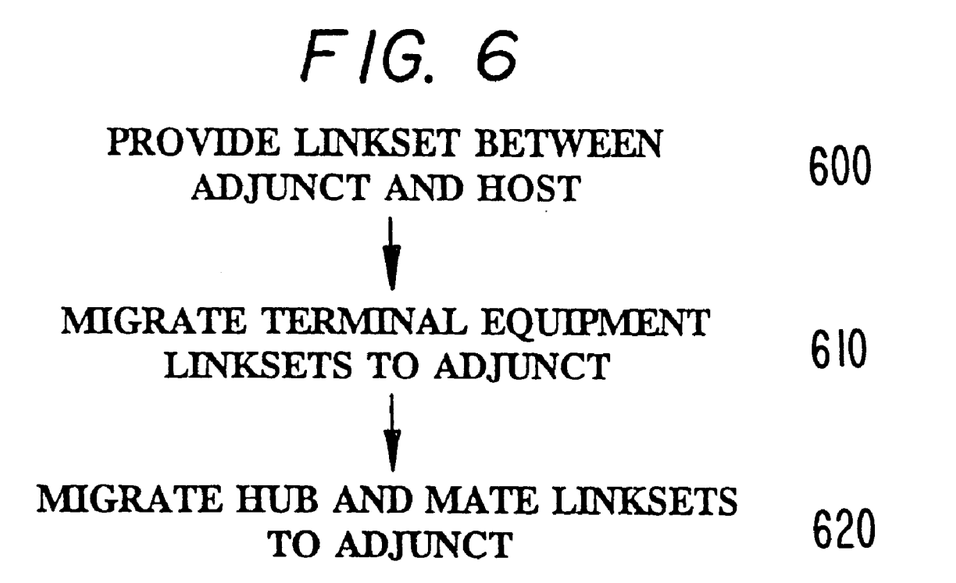
FIG. 6 illustrates a process for migration of linksets in accordance with an eighth embodiment of the invention.

A method in accordance with the eighth embodiment is illustrated in FIG. 6. As shown in FIG. 6, the method involves providing 600 a linkset between the adjunct and the host. The adjunct would be of the type disclosed in regard to the first embodiment or third embodiment, since the adjunct will ultimately assume all functions of the host and may provide additional functions. Linksets to subscriber terminal equipment are then migrated 610 to the adjunct. Linksets from hubs and mates are then migrated 620 to the adjunct. At this point the adjunct has effectively assumed the role of the host, and the host may be disconnected from the network.

Figure 7:
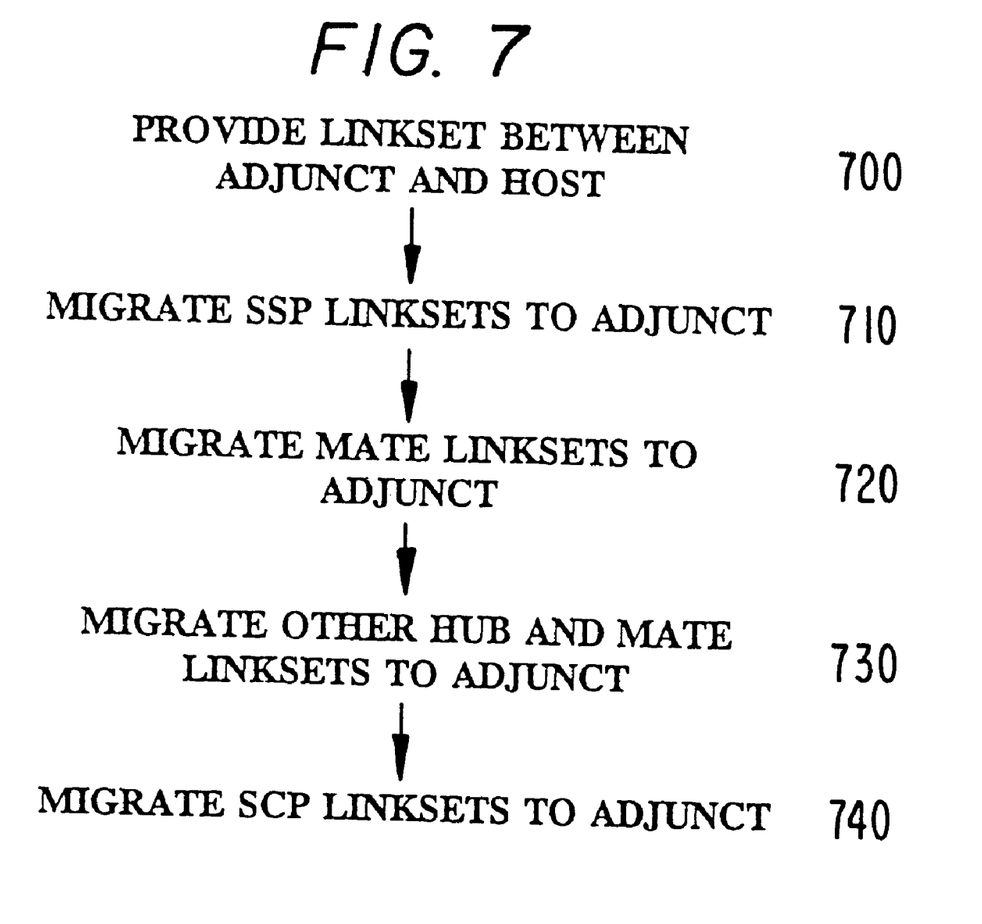
FIG. 7 illustrates a process for migration of linksets in accordance with an eighth embodiment of the invention.

A method in accordance with the ninth embodiment is illustrated in FIG. 7. As shown in FIG. 7, the method begins by providing 700 a linkset between the adjunct and the host. The adjunct would be of the type disclosed in regard to the fourth or sixth embodiments, since the adjunct will ultimately assume all functions of the host and may provide additional functions. Linksets from SSPs are then migrated 710 to the adjunct. Linksets from the mate hub of the host are then migrated 720 to the adjunct. Linksets from other hubs and mates are then migrated 730 to the adjunct. Linksets from SCPs may then be migrated 740. At this point the adjunct has effectively assumed the role of the host, and the host may be disconnected from the network. It is noted that while the migration of linksets from SCPs was disclosed above as a final step of the ninth embodiment, the location of this step in the overall order of the process may be chosen in accordance with the convenience of its execution.

It will be appreciated that it is often desirable to replace both a hub and its mate contemporaneously. Accordingly, the process of the ninth embodiment would be repeated for the host and adjunct of the mate hub.

While the above discussion has been provided to describe the basic invention and certain preferred embodiments, those having ordinary skill in the art will recognize that further alternative embodiments may be produced in accordance with the teachings in the field. The scope invention is not intended to be limited to the specific embodiments described above, but rather includes all embodiments fitting the definition provided in the appended claims, and all equivalents thereof.

What is claimed is:

1. A node of a communication network comprising:

a host device and an adjunct device joined by a first linkset, the host device having a host point code and the adjunct device having an adjunct point code, the host device communicating with nodes of the communication network through a second linkset, and the adjunct device communicating with nodes of the communication network through a third linkset, the host device comprising means for changing a destination point code of a message received through the second linkset from the host point code to the adjunct point code, and means for changing an originating point code of a message received through the first linkset from the adjunct point code to the host point code, and the adjunct device comprising means for performing a service requested in a message received through the first link set having the adjunct point code as a destination point code and for providing a reply having the adjunct point code as the originating point code and the originating point code of the received message as the destination point code, and means for performing a service requested in a message received through the third linkset having the host point code as the destination point code and for returning a reply having the host point code as the originating point code and the originating point code of the received message as the destination point code.

2. The node as claimed in claim 1, wherein said means for performing a service requested in a received message comprises means for performing a protocol conversion.

3. The node as claimed in claim 1, wherein said means for performing a service requested in a received message comprises means for performing a global translation.

4. A node of a communication network comprising:

a host device and an adjunct device joined by a first linkset, the host device having a host point code and the adjunct device having an adjunct point code, the host device communicating with nodes of the communication network through a second linkset, and the adjunct device communicating with nodes of the communication network through a third linkset, the host device comprising means for determining whether the host performs a function requested in a message received through the second linkset having the host point code as a destination point code, means for changing a destination point code of a message received through the second linkset requesting a function not performed by the host from the host point code to the adjunct point code, and means for changing an originating point code of a message received through the first linkset from the adjunct point code to the host point code, and the adjunct device comprising means for performing a service requested in a message received through the first link set having the adjunct point code as a destination point code and for providing a reply having the adjunct point code as the originating point code and the originating point code of the received message as the destination point code, and means for performing a service requested in a message received through the third linkset having the host point code as the destination point code and for returning a reply having the host point code as the originating point code and the originating point code of the received message as the destination point code.

5. The node as claimed in claim 4, wherein said means for performing a service requested in a received message comprises means for performing a protocol conversion.

6. The node as claimed in claim 4, wherein said means for performing a service requested in a received message comprises means for performing a global translation.

7. A method for replacing a host device constituting a terminal node of a communication network, comprising:

provic an adjunct device communicating with the host device through a first linkset, the adjunct device comprising means for performing a service requested in a message received through the first linkset having the adjunct point code as a destination point code and for providing a reply having the adjunct point code as an originating point code and the originating point code of the received message as the destination point code, and means for performing a service requested in a message received through a linkset to a node of the communication network having the host point code as the destination point code and for returning a reply having the host point code as the originating point code and the originating point code of the received message as the destination point code;

configuring the host device to comprise means for changing a destination point code of a message received from a node of the communication network from the host point code to the adjunct point code, and means for changing an originating point code of a message received from the adjunct device through the first linkset from the adjunct point code to the host point code; and migrating linksets joining the host device and hub nodes to join the adjunct device and said hub nodes, such that during migration the adjunct and the host both receive messages having the host point code as the destination point code.

8. The method as claimed in claim 7, wherein migrating linksets joining the host device and hub nodes is preceded by migrating linksets joining the host device and terminal equipment to join the adjunct and said terminal equipment.

9. A method for replacing a host device constituting a hub node of a communication network, comprising:

providing an adjunct device communicating with the host device through a first linkset, the adjunct device comprising means for performing a service requested in a message received through the first linkset having the adjunct point code as a destination point code and for providing a reply having the adjunct point code as the originating point code and the originating point code of the received message as the destination point code, and means for performing a service requested in a message received through a linkset to a node of the communication network having the host point code as the destination point code and for returning a reply having the host point code as an originating point code and the originating point code of the received message as the destination point code;

configuring the host device to comprise means for changing a destination point code of a message received from a node of the communication network from the host point code to the adjunct point code, and means for changing an originating point code of a message received from the adjunct device through the first linkset from the adjunct point code to the host point code; and migrating linksets joining the host device and a mated hub node to join the adjunct device and said mated hub node; and migrating linksets joining the host device and other network hub nodes to join the adjunct device and said other network hub nodes, such that during migration the adjunct and the host both receive messages having the host point code as the destination point code.

10. The method as claimed in claims 9, further comprising migrating linksets joining the host device and terminal nodes to join the adjunct device and said terminal nodes.

* * * * *